No. 860,891. PATENTED JULY 23, 1907.
W. A. ALLEN.
SUPPORTING AND RETAINING MEANS FOR TIRES.
APPLICATION FILED OCT. 24, 1906.
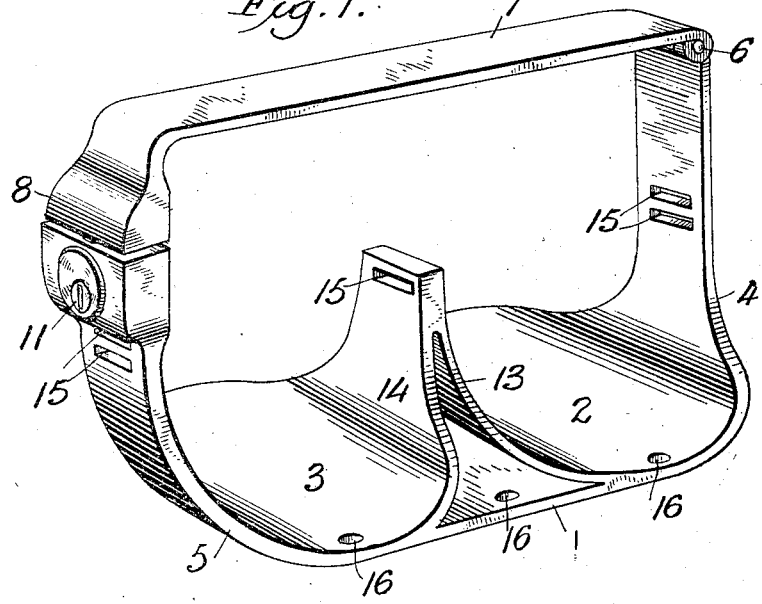
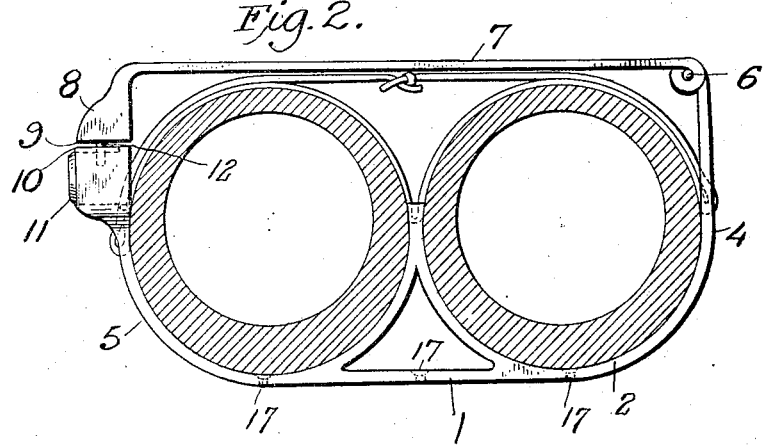
WITNESSES
INVENTOR
William A. Allen
BY
his ATTORNEY

UNITED STATES PATENT OFFICE.

WILLIAM A. ALLEN, OF NEW YORK, N. Y.

SUPPORTING AND RETAINING MEANS FOR TIRES.

No. 860,891.   Specification of Letters Patent.   Patented July 23, 1907.

Application filed October 24, 1906. Serial No. 340,343. REISSUED

*To all whom it may concern:*

Be it known that I, WILLIAM A. ALLEN, a citizen of the United States, residing at New York city, in the county of New York and State of New York, have invented certain new and useful Improvements in Supporting and Retaining Means for Tires, of which the following is a specification.

The present invention relates to supporting and retaining means for tires, and is especially designed to firmly retain upon the running board or at any other convenient place, the spare tires usually carried by motor vehicles.

Various expedients have been heretofore adopted to carry spare tires upon vehicles, but in the majority of cases the tires, when the vehicle is in motion, are badly jarred and chafed, and as a result weakened in parts.

My invention is designed to provide a suitable supporting and retaining element, wherein one or more tires may be firmly secured, without the tires being subject to shifting, jarring or chafing.

Moreover my invention provides means for locking the tires in the support, thus preventing their theft or removal by unauthorized persons.

The preferred form of the invention is illustrated in the accompanying drawing, wherein like reference characters refer to like parts throughout, and in which drawing Figure 1 is a perspective view of my invention; and Fig. 2 is a side elevational view.

Referring to the drawing 1 designates a base plate, being preferably integral with the tire supports 2 and 3, which latter have broadened bases to provide broad surfaces for the tires to rest upon, and lateral walls 4 and 5 serving as side supports for the tires.

It will be noted that one of the walls, that designated 4 in the drawing extends substantially the full height of the structure and is provided at or near its free end with a hinge 6 upon which the upper transverse bar 7 is mounted. The bar 7 is preferably substantially goose-neck shaped and the end opposite the hinge is broadened at 8 to form a lower flat surface 9 adapted to rest upon and coincide with a similarly broadened flat surface 10 upon the upper end of the lateral wall 5. Within the enlarged end of the wall 5 is a lock 11 adapted to receive a hasp or latch 12 extending from the surface 9 of the transverse bar 7. It will be obvious that upon closing the arm 7 down upon the wall 5 and turning the lock 11 by means of a key any tires held by the support are secured against removal.

The supports 2 and 3 are extended to form inner walls 13 and 14 which are integral at their upper ends, the said inner walls extending preferably about half the height of the structure. Suitably formed apertures 15 are provided in each of the walls, through which straps may pass to more firmly hold the tires in place, and in the bases of the supports 2 and 3 and the base flat 1 are orifices 16 through which screws 17 pass to hold the entire supporting structure to the base board or other part of the motor vehicle.

A tire support as above described is simple in structure, may be cheaply made and is strong and durable in use.

Having thus described my invention, what I claim as new and desire to secure by Letters Patent is:—

1. In a device of the character described, the combination with tire supports having broadened retaining surfaces, of upwardly extending apertured lateral walls associated with said tire supports, an apertured intermediate wall, one of said lateral walls carrying a lock at its upper end, and the other lateral wall having hinged thereto a transverse bar the end of which is adapted to engage the lock on the first mentioned lateral wall, substantially as described.

2. In a device of the character described, the combination with a base member, of tire supports held thereby, said tire supports comprising curved broadened retaining surfaces, and upwardly extending apertured lateral and intermediate walls, one of said lateral walls being provided with a lock, and the other said lateral wall having hinged thereto a transverse bar, the end of which is designed to engage said lock, substantially as described.

3. In a device of the character described, the combination of tire supporting means having lateral walls and inner walls of lesser height than said lateral walls, a transverse bar hinged to one of said lateral walls and adapted to extend over said supporting means and into engagement with the other lateral wall, and a lock upon the last mentioned lateral wall for locking the transverse bar in closed position over the supporting means, substantially as described.

4. In a device of the character described, the combination of a base plate provided with screw receiving orifices and having formed integrally therewith tire supporting means provided with broadened bases and apertured lateral walls of unequal height, apertured inner walls extending upwardly from said supporting means, a transverse bar hinged to the higher of said lateral walls and reaching into engagement with the other said lateral wall, and a lock in said last mentioned lateral wall adapted to receive a hasp upon the free end of said transverse bar, substantially as described.

In testimony whereof I have affixed my signature in presence of two witnesses.

WILLIAM A. ALLEN.

Witnesses:
 WILLIAM M. GOLDEN, Jr.,
 ELLA R. LAIRD.